United States Patent
Anderson et al.

(10) Patent No.: US 7,280,830 B2
(45) Date of Patent: Oct. 9, 2007

(54) AUTOMATIC REGISTRATION SERVICES PROVIDED THROUGH A HOME RELATIONSHIP ESTABLISHED BETWEEN A DEVICE AND A LOCAL AREA NETWORK

(75) Inventors: Eric C. Anderson, Gardnerville, NV (US); Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 343 days.

(21) Appl. No.: 10/859,735

(22) Filed: Jun. 2, 2004

(65) Prior Publication Data

US 2005/0277412 A1 Dec. 15, 2005

(51) Int. Cl.
*H04Q 7/20* (2006.01)

(52) U.S. Cl. .............................. 455/435.1; 455/435.2; 455/410; 455/411

(58) Field of Classification Search ............ 455/435.1, 455/435.2, 410, 411, 414.1, 434, 406, 566
See application file for complete search history.

(56) References Cited

U.S. PATENT DOCUMENTS

| | | | |
|---|---|---|---|
| 6,091,956 A * | 7/2000 | Hollenberg | 455/456.5 |
| 6,449,473 B1 * | 9/2002 | Raivisto | 455/410 |
| 6,542,740 B1 * | 4/2003 | Olgaard et al. | 455/432.1 |
| 7,054,618 B1 * | 5/2006 | McCullough | 455/414.1 |
| 2003/0078959 A1 * | 4/2003 | Yeung et al. | 709/201 |
| 2003/0200297 A1 * | 10/2003 | Wiener | 709/223 |
| 2004/0039813 A1 * | 2/2004 | Clark et al. | 709/224 |
| 2004/0098515 A1 * | 5/2004 | Rezvani et al. | 709/400 |
| 2004/0249922 A1 * | 12/2004 | Hakcman et al. | 709/223 |
| 2005/0027608 A1 * | 2/2005 | Wiesmuller et al. | 705/26 |

OTHER PUBLICATIONS

Anderson, Eric C., "Establishing a Home Relationship Between a Wireless Device and a Server in a Wireless Network," U.S. Appl. No. 10/833,381, filed Apr. 28, 2004, 31 pages.

* cited by examiner

*Primary Examiner*—Joseph Feild
*Assistant Examiner*—Huy D. Nguyen

(57) ABSTRACT

A method and network for automatic registration of a new device first establishes a "home" relationship between the new device and a network server, such that no additional configuration is required by a user of the new device to communicate over a network once the relationship is established. Next, registration information for the new device is automatically obtained, and can include information concerning the user of the new device, which can already be known to the network server, the new device itself obtainable directly from the new device, and the network server. The network server then establishes a connection with a registration server and sends the registration information to it. In this manner, the new device is automatically registered with very little, if any, input from the user. Other services can be provided to the new device by the registration server utilizing the "home" relationship.

52 Claims, 3 Drawing Sheets

AUTOMATIC REGISTRATION SERVICES PROVIDED THROUGH A HOME RELATIONSHIP ESTABLISHED BETWEEN A DEVICE AND A LOCAL AREA NETWORK

FIELD OF THE INVENTION

The present invention relates to computer networks, and more particularly to providing an automatic registration service through establishing a home relationship between a device and a network server.

BACKGROUND OF THE INVENTION

The process of registering a newly-purchased electronic device is often cumbersome. Typically, registration involves installing the device's software on a personal computer, filling out paper forms for warranty service, and sometimes authorization and on-line registration. Upgrades for the device, if available, typically require a user to manually search for them, and may involve a complex process of download, transfer, and installation. After this process is completed, the actual use of the device includes connecting to the local network either in a wired or wireless manner. In addition, it is necessary typically to learn a new set of software functions.

A typical user owns multiple devices, each of which requires the user to perform the above process for their registration, use, and maintenance. The process is complicated by the fact that the process for each device is typically unique to the device or company. This limits the penetration of the marketplace for high technology products.

Accordingly, there exists a need for a method and network for automatic registration of a new device through the establishment of a home relationship with a network server. The present invention addresses such a need.

SUMMARY OF THE INVENTION

A method and network for automatic registration of a new device first establishes a "home" relationship between the new device and a network server, such that no additional configuration is required by a user of the new device to communicate over a network once the relationship is established. Next, registration information for the new device is automatically obtained, and can include information concerning the user of the new device, which can already be known to the network server, the new device itself obtainable directly from the new device, and the network server. The network server then establishes a connection with a registration server and sends the registration information to it. In this manner, the new device is automatically registered with very little, if any, input from the user. Other services can be provided to the new device by the registration server utilizing the "home" relationship.

DETAILED DESCRIPTION

The present invention provides a method and network for automatic registration of a new device through the establishment of a home relationship with a network server. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
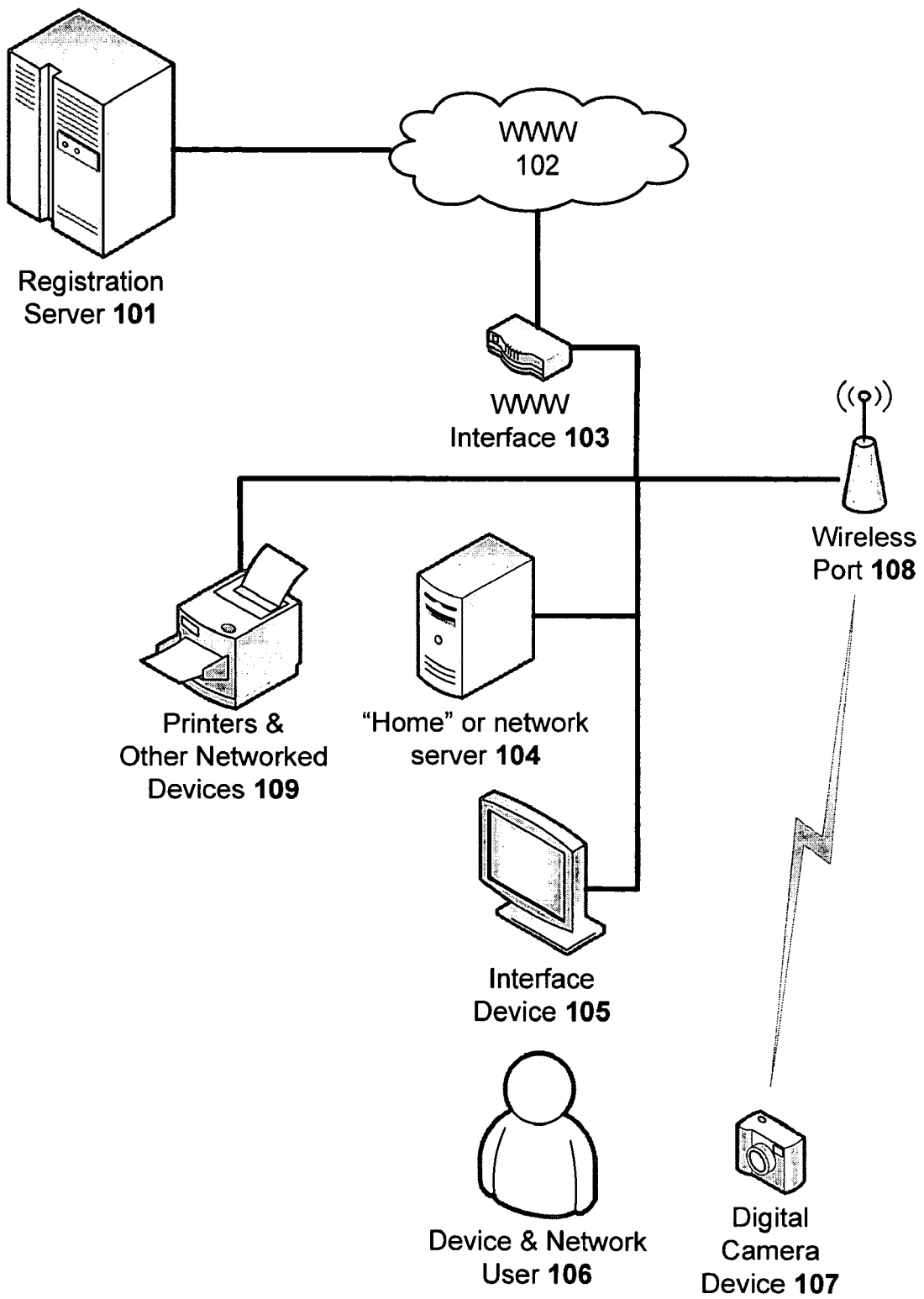
FIG. 1 illustrates a preferred embodiment of a network for automatic registration of a new device through the establishment of a "home" relationship with a network server in accordance with the present invention.

FIG. 1 illustrates a preferred embodiment of a network for automatic registration of a new device through the establishment of a "home" relationship, with a network server in accordance with the present invention. The network includes a "home" network server 104, to which a user 106 can interface through an interface device 105. The network server 104 can establish "home" relationships with various devices, such as printers and other networked devices 109. When the user purchases a new device 107, such as a digital camera, the "home" relationship can be established between the network server 104 and the new device 107. The establishment of this relationship is the identification of the network server 104 as "home" from the point of view of the devices 107-109, and the identification of an "owned device" from the point of view of the network server 104. The network server 104 is capable of connecting to a registration server 101 of a particular owned device through the Internet 102 via an Internet interface 103.

Figure 2:
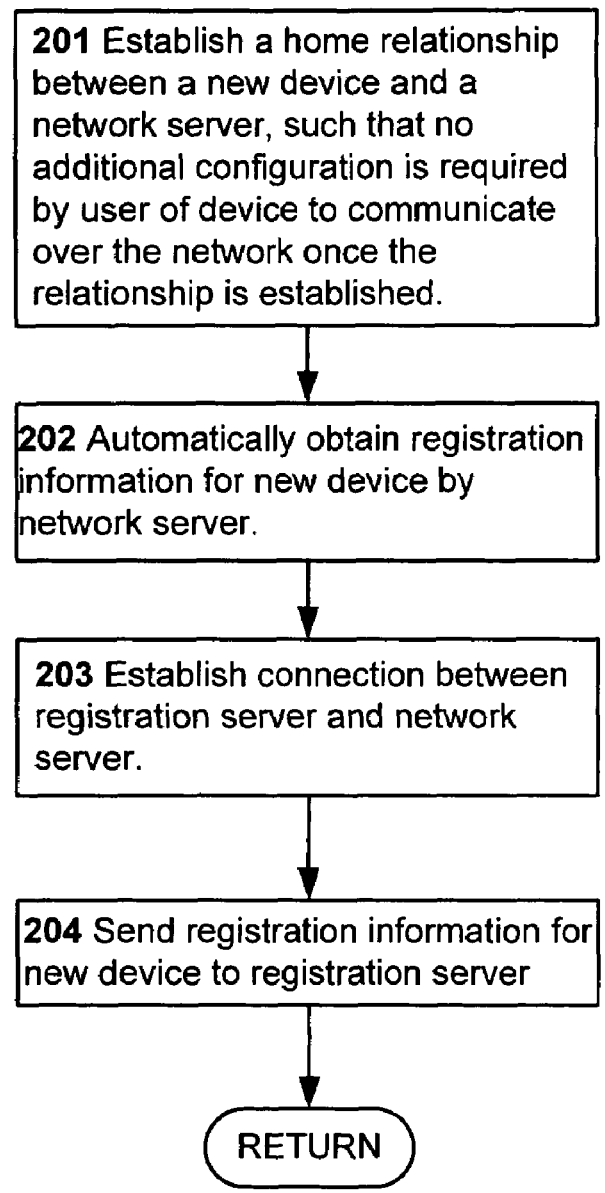
FIG. 2 is a flowchart illustrating a preferred embodiment of a method for automatic registration of a new device through the establishment of a "home" relationship with a network server in accordance with the present invention.

FIG. 2 is a flowchart illustrating a preferred embodiment of a method for automatic registration of a new device through the establishment of a "home" relationship with a network server in accordance with the present invention. Referring to both FIGS. 1 and 2, first, a "home" relationship is established between the new device 107 and the network server 104, via step 201, such that no additional configuration is required by the user 106 of the new device 107 to communicate over the network once the relationship is established. In one embodiment, the establishment of the "home" relationship begins when the network server 104 detects the presence of the new device 107 and attempts to recognize it by requesting device identification from the new device 107. The device identification is information that uniquely identifies the new device 107, such as a device ID, serial number, etc. If the device identification is found in an "owned device" database or list (not shown) at the network server 104, then the new device 107 is granted access to the network. If not, then the network server 104 first obtains from the user 106 the authorization to grant access to the new device 107. In another embodiment, the "home" relationship between the new device 107 and the network server 104 is established manually by a user or a network administrator. The establishment of the "home" relationship is further described in the co-pending U.S. patent application entitled "Establishing a Home Relation Between a Wireless Device and a Server in a Wireless Network", Ser. No. 10/833,381, filed on Apr. 28, 2004. This co-pending patent application is hereby incorporated by reference.

Once the "home" relationship is established between the new device 107 and the network server 104, the new device 107 recognizes the network as its home network, and the network server 104 recognizes the new device 107 as an "owned" device that is an extension of the network. Using the "home" relationship, the new device 107 is granted automatic access to the network.

Next, the registration information for the new device 107 is automatically obtained by the network server 104, via step 202. The registration information can include information concerning the user 106 of the new device 107, information concerning the network server 104, and information concerning the new device 107 itself. The user's information can include name, address, etc. and can be already known to the network server 104. The registration information for the new device 107 can be its model, serial number, firmware version, etc., obtainable directly from the new device 107. The registration information for the network server 104 can include the operating system type and configuration, process type and speed, memory, disk space available, etc. and is known to the network server 104 without user input.

A connection between the registration server 101 and the network server 104 is then established, via step 203. In the preferred embodiment, the new device 107 provides the information for this connection, and can include the registration server's public key so that a secure connection can be established. In establishing this secure connection, the network server uses the public key to encrypt information sent to the registration server 101. The registration server 101 uses its private key to decrypt the information from the network server 104. The registration server 101 can in turn use its private key to encrypt information sent to the network server 104. The network server 104 then uses the public key to decrypt this information.

Once the connection between the registration server 101 and the network server 104 is established, the registration information is sent to the registration server 101, via step 204. Alternatively, the new device 107 could query for any missing registration information from the network server 104 and send the registration information directly to the registration server 101. In this manner, the new device 107 is automatically registered with very little, if any, input from the user 106.

Although the preferred embodiment is described above with a "home" relationship established between the network server 104 and the new device 107, one of ordinary skill in the art will understand that other types of relationships can be established between the network server 104 and the new device 107 without departing from the spirit and scope of the present invention.

Once registered, many services can also be provided through the "home" relationship between the network server 104 and the new 107. These services include automated software or firmware updates, automatic system software selection and installation, automatic software installtion for other network devices to support the new device, and special offerings. In providing automated software or firmware updates, once the registration information for the new device 107 and the network server 104 is provided to the registration server 101, the registration server 101 can connect to the network server 104 in the future when software or firmware updates are available for the new device 107. If updates are available, they are automatically downloaded and installed on the new device 107 by the network server 104.

In providing automatic system software selection and installation, using the registration information for the network server 104, the registration server 101 can automatically provide software to the network server 104 for features that support the new device 107. The network server 104 automatically downloads and installs the software, and the features will automatically appear within the user interface of the network server 104. Updates for this support can also be automatically downloaded and installed over time.

In providing automatic software installation for other network devices to support the new device, drivers may be downloaded for network devices that are used by the new device 107. For example, if the new device 107 is a digital camera, special printer drivers may be downloaded to improve print quality on a recognized printer on the network.

In providing special offerings, the user can be presented with a series of offerings from the manufacturer of the new device 107, such as special additional features and services, and accessories. These can be automatically purchased with the user's permission, using financial services within the network server 104 interacting with the registration server 101. For example, a "standard" version of software can be downloaded for the network server 104. Then, additional features for this software can be offered for additional costs. This service can also be provided for the operating software of the new device 107 itself. For example, if the new device 107 is a digital camera, special "art effects" or "picture frame" options may be offered, and if purchased, uploaded into the device 107.

Figure 3:
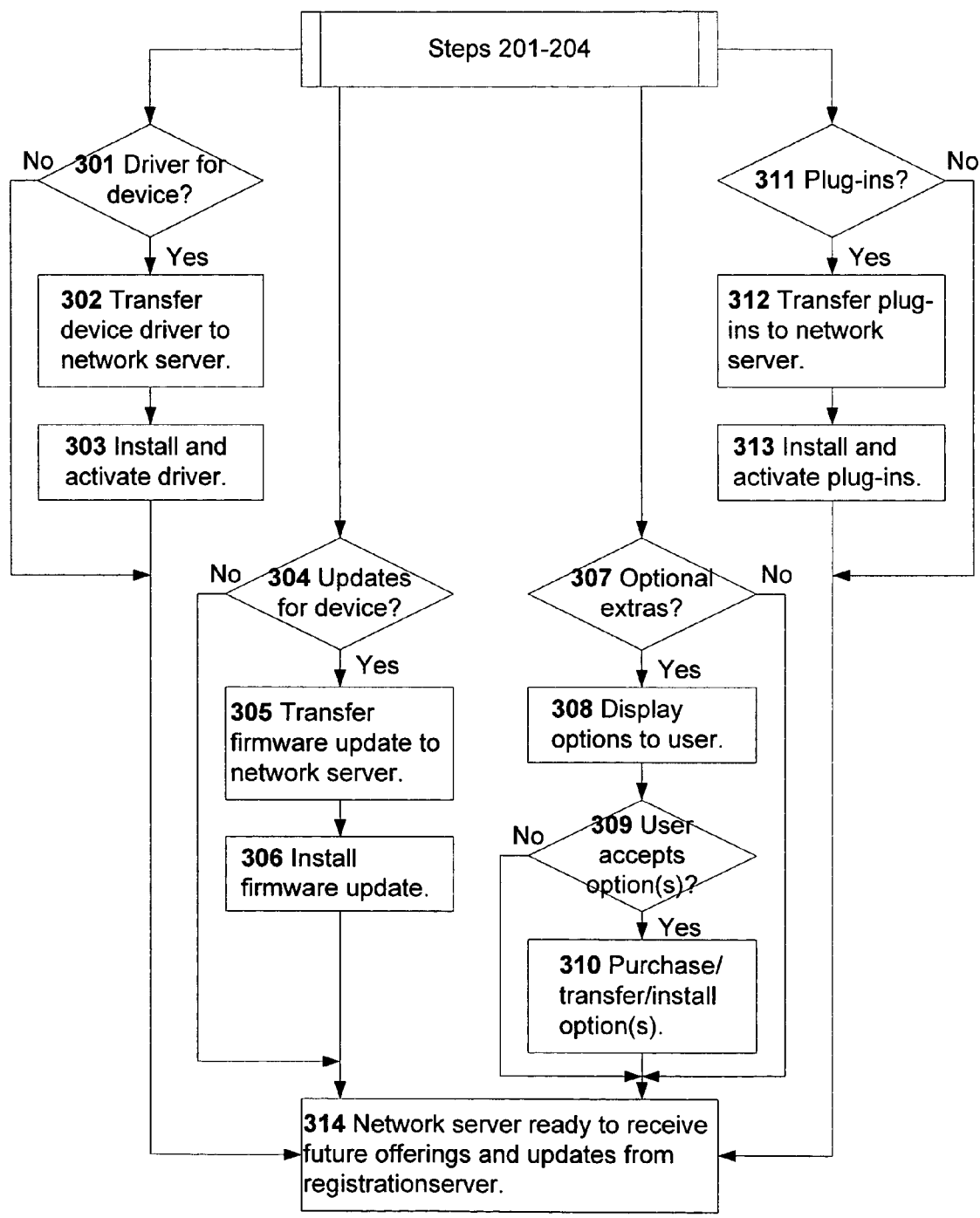
FIG. 3 is a flowchart illustrating example services provided by the method and system for automatic registration of a new device through the establishment of a "home" relationship with a network server in accordance with the present invention.

FIG. 3 is a flowchart illustrating example services provided by the method and system for automatic registration of a new device through the establishment of a "home" relationship with a network server in accordance with the present invention. In a first example, when registering the new device 107, the registration server 101 determines if a driver for the new device 107 is required for the device to run on the network server 104, via step 301. If so, the driver is transferred to the network server 104, via step 302. The network server 104 installs and activates the driver, via step 303.

In a second example, the registration server 101 determines if firmware updates are available for the new device 107, via step 304. If so, then the firmware update is transferred to the network server 104, via step 305. The network server 104 then installs the firmware update onto the new device 107, via step 306.

In a third example, the registration server 101 determines if optional extras are available for the new device 107, via step 307. If so, these options are displayed to the user 106 via the interface device 105, via step 308. If the user decides to accept an option, via step 309, then the option is purchased and transferred to the network server 104 and installed, via step 310.

In a fourth example, the registration server 101 determines if plug-ins for the network server 104 are available, via step 311. If so, the plug-ins are transferred to the network server 104, via step 312. The plug-ins are then installed on the network server 104 and activated, via step 313.

In the preferred embodiment, because the registration server 101 has information for the network server 104, the registration server 101 can contact the network server 104 when needed. Thus, when not providing a service, the network server 104 is in a state of readiness to receive future offerings and updates from the registration server 101, via step 314. This avoids the need for the network server 104 to periodically contact the registration server 101 just to see if updates or offerings are available for the new device 107. It also allows the manufacturer or service provider to schedule distribution of updates and improvements to minimize congestion on its server.

A method and network for automatic registration of a new device through the establishment of a "home" relationship with a network server has been disclosed. The method first establishing a "home" relationship between the new device and the network server, such that no additional configuration is required by a user of the new device to communicate over a network once the relationship is established. Next, registration information for the new device is automatically obtained by the network server. The registration information can include information concerning the user of the new device, which can already be known to the network server, information concerning the new device obtainable directly from the new device, and information concerning the network server. The network server then establishes a connection with a registration server, and sends the registration information to the registration server. In this manner, the new device is automatically registered with very little, if any, input from the user. Once registered, other services can also be provided to the new device by the registration server utilizing the "home" relationship between the new device and the network server.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatic registration of a new wireless device with a registration server, comprising:
    establishing a home relationship between the new wireless device and a network server, such that no additional configuration is required by a user of the new device to communicate over a network once the relationship is established, wherein establishing a home relationship includes, determining at the network server, that the wireless device is an owned device, wherein the owned device is previously known to the network server;
    automatically obtaining registration information for the new device;
    establishing a connection between a registration server and the network server; and
    sending the registration information from the network server to the registration server.

2. The method of claim 1, wherein the registration information comprises information concerning the user of the new device.

3. The method of claim 1, wherein the registration information comprises information concerning the network server.

4. The method of claim 3, wherein the registration information concerning the network server comprises an operating system type and configuration.

5. The method of claim 1, wherein the registration information comprises information concerning the new device, obtainable directly from the new device.

6. The method of claim 5, wherein the registration information concerning the new device comprises a unique device identifier.

7. The method of claim 1, wherein the establishing of the connection between the registration server and the network server comprises:
    obtaining connection information from the new device; and
    establishing the connection between the registration server and the network server utilizing the connection information.

8. The method of claim 7, wherein the connection information comprises a public key of a public/private key pair for the registration server.

9. The method of claim 1, wherein the sending comprises:
    sending the registration information from the network server to the registration server, wherein the registration information is encrypted using a public key of a public/private key pair for the registration server, wherein the registration server decrypts the registration information using a private key of the public/private key pair.

10. The method of claim 1, further comprising:
    determining by the registration server if software or firmware updates are available for the new device;
    transferring the updates to the network server, if software or firmware updates are available; and
    installing the updates onto the new device by the network server.

11. The method of claim 1, further comprising:
    determining by the registration server if software updates for the network server are available for support of the new device;
    transferring the updates to the network server, if software updates are available; and
    installing the updates onto the network server.

12. The method of claim 1, further comprising:
    determining by the registration server if software for at least one device coupled to the network server for support of the new device is available;
    transferring the software to the network server, if the software is available; and
    installing the software onto the network server.

13. The method of claim 1, further comprising:
    determining by the registration server if special offers for the new device are available;
    transferring the special offers to the network server, if the special offers are available; and
    displaying the special offers to the user of the new device.

14. The method of claim 13, further comprising:
    determining if the user has accepted at least one special offer; and
    implementing the special offer at the network server or the new device, if the user has accepted at least one special offer.

15. A computer readable medium encoded with computer executable instructions for automatic registration of a new wireless device with a registration server, comprising:
    establishing a home relationship between the new wireless device and the network server, such that no additional configuration is required by a user of the new wireless device to communicate over a network once the relationship is established, wherein establishing a home relationship includes, determining at the network server, that the wireless device is an owned device, wherein the owned device is previously known to the network server;

automatically obtaining registration information for the new device;

establishing a connection between a registration server and the network server; and sending the registration information from the network server to the registration server.

16. The medium of claim 15, wherein the registration information comprises information concerning the user of the new device.

17. The medium of claim 15, wherein the registration information comprises information concerning the network server.

18. The medium of claim 17, wherein the registration information concerning the network server comprises an operating system type and configuration.

19. The medium of claim 15, wherein the registration information comprises information concerning the new device, obtainable directly from the new device.

20. The medium of claim 19, wherein the registration information concerning the new device comprises a unique device identifier.

21. The medium of claim 15, wherein the establishing of the connection between the registration server and the network server comprises:

obtaining connection information from the new device; and establishing the connection between the registration server and the network server utilizing the connection information.

22. The medium of claim 21, wherein the connection information comprises a public key of a public/private key pair for the registration server.

23. The medium of claim 15, wherein the sending comprises:

sending the registration information from the network server to the registration server, wherein the registration information is encrypted using a public key of a public/private key pair for the registration server, wherein the registration server decrypts the registration information using a private key of the public/private key pair.

24. The medium of claim 15, further comprising:

determining by the registration server if software or firmware updates are available for the new device;

transferring the updates to the network server, if software or firmware updates are available; and installing the updates onto the new device by the network server.

25. The medium of claim 15, further comprising:

determining by the registration server if software updates for the network server are available for support of the new device;

transferring the updates to the network server, if software updates are available; and installing the updates onto the network server.

26. The medium of claim 15, further comprising:

determining by the registration server if software for at least one device coupled to the network server for support of the new device is available;

transferring the software to the network server, if the software is available; and installing the software onto the network server.

27. The medium of claim 15, further comprising:

determining by the registration server if special offers for the new device are available; transferring the special offers to the network server, if the special offers are available; and displaying the special offers to the user of the new device.

28. The medium of claim 27, further comprising:

determining if the user has accepted at least one special offer; and implementing the special offer at the network server or the new device, if the user has accepted at least one special offer.

29. A network, comprising:

a network server; and a new wireless device coupled to the network server, wherein the new wireless device has a home relationship with the network server, such that no additional configuration is required by a user of the new wireless device to communicate over the network once the relationship is established, and wherein the network server identifies the new device as an owned device, wherein the owned device is previously known to the network server, wherein registration information is automatically obtained for the new device, wherein a connection is established between the network server and a registration server, and wherein the registration information is sent from the network server to the registration server.

30. The network of claim 29, wherein the registration information comprises information concerning the user of the new device.

31. The network of claim 29, wherein the registration information comprises information concerning the network server.

32. The network of claim 31, wherein the registration information concerning the network server comprises an operating system type and configuration.

33. The network of claim 29, wherein the registration information comprises information concerning the new device, obtainable direction from the new device.

34. The network of claim 33, wherein the registration information concerning the new device comprises a unique device identifier.

35. A method for automatic registration of a new wireless device with a registration server, comprising:

establishing a relationship between the new wireless device and a network server, wherein no additional configuration is required by a user of the new wireless device to communicate over a network once the relationship is established;

automatically obtaining registration information for the new wireless device, including registration information automatically obtained from the network server, wherein establishing a home relationship includes, determining, at the network server, that the new device is an owned device, wherein the owned device is previously known to the network server;

establishing a connection between a registration server and the new device; and sending the registration information from the new device to the registration server.

36. The method of claim 35, wherein the relationship is a home relationship, such that no additional configuration is required by a user of the new device to communicate over a network once the home relationship is established.

37. The method of claim 35, wherein the registration information obtained from the network server comprises information concerning a user of the new device.

38. The method of claim 35, wherein the registration information obtained from the network server comprises information concerning the network server.

39. The method of claim 38, wherein the registration information concerning the network server comprises an operating system type and configuration.

40. The method of claim 35, wherein the registration information comprises a unique device identifier for the new device.

41. A computer readable medium encoded with computer executable instructions for automatic registration of a new wireless device with a registration server, comprising instructions for:
- establishing a relationship between the new wireless device and a network server, wherein no additional configuration is required by a user of the new wireless device to communicate over a network once the relationship is established;
- automatically obtaining registration information for the new wireless device, including registration information automatically obtained from the network server, wherein establishing a home relationship includes, determining, at the network server, that the new device is an owned device, wherein the owned device is previously known to the network server;
- establishing a connection between a registration server and the new device; and
- sending the registration information from the new device to the registration server.

42. The medium of claim 41, wherein the relationship is a home relationship, such that no additional configuration is required by a user of the new device to communicate over a network once the home relationship is established.

43. The medium of claim 41, wherein the registration information obtained from the network server comprises information concerning a user of the new device.

44. The medium of claim 41, wherein the registration information obtained from the network server comprises information concerning the network server.

45. The medium of claim 44, wherein the registration information concerning the network server comprises an operating system type and configuration.

46. The medium of claim 41, wherein the registration information comprises a unique device identifier for the new device.

47. A network, comprising:
- a network server; and
- a new wireless device coupled to the network server, wherein the new wireless device has a relationship with the network server, wherein no additional configuration is required by a user of the new wireless device to communicate over a network once the relationship is established, and wherein the network server identifies the new device as an owned device, wherein the owned device is previously known to the network server,
- wherein registration information is automatically obtained for the new wireless device, including registration information obtained from the network server, wherein a connection is established between the new wireless device and a registration server, and wherein the registration information is sent from the new wireless device to the registration server.

48. The network of claim 47, wherein the relationship is a home relationship, such that no additional configuration is required by a user of the new device to communicate over a network once the home relationship is established.

49. The network of claim 47, wherein the registration information obtained from the network server comprises information concerning a user of the new device.

50. The network of claim 47, wherein the registration information obtained from the network server comprises information concerning the network server.

51. The network of claim 50, wherein the registration information concerning the network server comprises an operating system type and configuration.

52. The network of claim 47, wherein the registration information comprises a unique device identifier for the new device.

* * * * *